(12) United States Patent
Djordjevic et al.

(10) Patent No.: US 9,166,728 B2
(45) Date of Patent: Oct. 20, 2015

(54) NONBINARY LDPC CODED MODULATION WITHOUT BANDWIDTH EXPANSION FOR HIGH-SPEED OPTICAL TRANSMISSION

(71) Applicant: NEC Laboratories America, Inc., Princeton, NJ (US)

(72) Inventors: Ivan B. Djordjevic, Tucson, AZ (US); Lei Xu, Princeton Junction, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 490 days.

(21) Appl. No.: 13/646,392

(22) Filed: Oct. 5, 2012

(65) Prior Publication Data

US 2013/0089326 A1   Apr. 11, 2013

Related U.S. Application Data (60) Provisional application No. 61/543,865, filed on Oct. 6, 2011.

(51) Int. Cl.
*H04J 14/06* (2006.01)
*H04J 14/04* (2006.01)
*H04B 10/50* (2013.01)

(52) U.S. Cl.
CPC ............ *H04J 14/04* (2013.01); *H04B 10/5055* (2013.01); *H04J 14/06* (2013.01)

(58) Field of Classification Search
CPC ..... H04L 1/0045; H04L 1/005; H04L 1/0042; H04L 27/38; H04L 1/0055; H04L 1/0076; H04L 1/0058; H04L 27/2627; H04L 27/2649; H04B 10/5055; H04B 1/69; H04B 1/707; H04B 10/2581; H04J 14/06; H04J 13/0074; H04J 14/04; H04J 11/00; H04J 2011/0003; H03M 13/1171; H03M 13/116

USPC ............. 398/65, 77, 152, 140–144, 182, 184, 398/188, 202, 205, 183

See application file for complete search history.

(56) References Cited

U.S. PATENT DOCUMENTS 8,184,993 B2 * 5/2012 Djordjevic et al. ........... 398/205
8,386,880 B2 * 2/2013 Savin ............................ 714/752

(Continued)

OTHER PUBLICATIONS

Polarization-multiplexed rate-adaptive nonbinary-quasi-cyclic-LDPC-coded multilevel modulation with coherent detection for optical transport networks. Murat Arabaci,1, Ivan B. Djordjevic,1 Ross Saunders,2 and Roberto M. Marcoccia2 Published Jan. 15, 2010.*

(Continued)

*Primary Examiner* — Hibret Woldekidan
(74) *Attorney, Agent, or Firm* — Joseph Kolodka (57) ABSTRACT

Systems and methods for data transport, comprising encoding one or more streams of input data using nonbinary low density parity check (NB-LDPC) encoders, corresponding to orthogonal polarization states. Receiving one or more streams of input data using a buffer coupled to the encoders, the data written to the buffer bR bits at a time, where R is the code rate. Generating one or more signals using a $2^b$-ary mapper implemented as a look-up table (LUT) to store coordinates of a corresponding signal constellation, the $2^b$-ary mapper configured to assign bits of one or more signals to a signal constellation and to associate the bits of the signals with signal constellation points, wherein the constellation is expanded to avoid bandwidth expansion due to coding, generating substantial net coding gains within a same bandwidth. Modulating nonbinary LDPC-coded data streams using in-phase/quadrature (I/Q) modulators and multiplexing the data streams using polarization beam combiner.

11 Claims, 6 Drawing Sheets

(56) References Cited

U.S. PATENT DOCUMENTS

| | | | | |
|---|---|---|---|---|
| 8,504,891 | B2* | 8/2013 | Zhou et al. | 714/758 |
| 8,644,067 | B2* | 2/2014 | Jeon | 365/185.03 |
| 8,654,880 | B2* | 2/2014 | Zhou et al. | 375/267 |
| 8,719,656 | B2* | 5/2014 | Arabaci et al. | 714/752 |
| 8,743,984 | B2* | 6/2014 | Djordjevic et al. | 375/265 |
| 8,793,551 | B2* | 7/2014 | Zhou et al. | 714/752 |
| 8,977,121 | B2* | 3/2015 | Djordjevic et al. | 398/44 |
| 2009/0287981 | A1* | 11/2009 | Kimura et al. | 714/752 |
| 2009/0297144 | A1* | 12/2009 | Djordevic et al. | 398/39 |
| 2011/0078533 | A1* | 3/2011 | Zhou et al. | 714/752 |
| 2011/0085624 | A1* | 4/2011 | Djordjevic et al. | 375/341 |
| 2011/0119554 | A1* | 5/2011 | Savin | 714/752 |
| 2012/0104168 | A1* | 5/2012 | Latorre Plaza et al. | 244/123.1 |
| 2012/0263251 | A1* | 10/2012 | Djordjevic et al. | 375/261 |
| 2014/0270759 | A1* | 9/2014 | Djordjevic et al. | 398/44 |
| 2015/0104168 | A1* | 4/2015 | Djordjevic et al. | 398/44 |

OTHER PUBLICATIONS

Next Generation FEC for High-Capacity Communication in Optical Transport Networks Dan B. Djordjevic, Member, IEEE, Murat Arabaci, Student Member, IEEE, and Lyubomir L. Minkov (Invited Paper), Published Aug. 15, 2009.*

Arabaci, et al., "Four-Dimensional Nonbinary LDPC-Coded Modulation Schemes for Ultra-High-Speed Optical Fiber Communication", IEEE Photonics Technology Letters, vol. 23, No. 18, Sep. 15, 2011, pp. 1280-1282.

Magarini, et al. Concatenated Coded Modulation for Optical Communications Systems, IEEE Photonics Technology Letters, vol. 22, No. 16, Aug. 15, 2010, pp. 1244-1246.

Batshon, Hussam G., "Interactive Polar Quantization-Based Modulation to Achieve Channel Capacity in Ultrahigh-Speed Optical Communication Systems", IEEE Photonics Journal, vol. 2, No. 4, Aug. 2010, pp. 593-599.

Benedetto, et al., "Trellis Coded Polarization Shift Keying Modulation for Digital Optical Communications", IEEE Transactions on Communications, vol. 43, No. 2/3/4, Feb./Mar./Apr. 1995, pp. 1591-1602.

Bulow, et al., "Soft Coded Modulation for Sensitivity Enhancement of Coherent 100-Gbit/s Transmission Systems", Optical Society of America, 2009, 3 Pages.

Chang, et al., "On Calculating the Capacity of an Infinite-Input Finite (Infinite)—Output Channel", IEE Transactions on Information Theory, vol. 34, No. 5., Sep. 1988, pp. 1004-1010.

Djordjevic, et al., "Next Generation FEC for High-Capacity Communication in Optical Transport Networks", Journal of Lightwave Technology, vol. 27, No. 16, Aug. 15, 2009, pp. 3518-3530.

Djordjevic, et al., "Surpression of Fiber Nonlinearities and PMD in Coded-Modulation Schemes With Coherent Detection by Using Turbo Equalization", Optical Society of America, vol. 1, No. 6, Nov. 2009, pp. 555-564.

Essiambre, et al. "Capacity Limits of Fiber Networks", Journal of Lightwave Technology, vol. 28, No. 4, Feb. 15, 2010, pp. 662-701.

Liu, et al. "Generation and FEC-Decoding of a 231.5-Gb/s PDM-OFDM Signal with 256-Interactive-Polar-Modulation Acheiving 11.15-b/s Hz Intrachannel Spectral Efficiency and 800-km Reach", Optical Society of America, 2012, 3 Pages.

Ungerboeck, "Channel Coding with Multilevel/Phase Signals", IEEE Transactions of Information Theory, vol. IT-28, No. 1, Jan. 1982, pp. 55-67.

Winzer, et al., "Beyond 100G Ethernet", IEEE Communications Magazine, Jul. 2012, pp. 26-30.

Zhang, et al. "Optimized Four-Dimensional Mapping for High-Speed Optical Communication Systems", Optical Society of America, Technology Digest, 2012, Jan. 23, 2012, 3 Pages.

* cited by examiner

NONBINARY LDPC CODED MODULATION WITHOUT BANDWIDTH EXPANSION FOR HIGH-SPEED OPTICAL TRANSMISSION

RELATED APPLICATION INFORMATION

This application claims priority to provisional application Ser. No. 61/543,865 filed on Oct. 6, 2011, incorporated herein by reference. This application is related to a non-provisional application, U.S. Ser. No. 13/646,454, filed on Oct. 5, 2012, and incorporated by reference herein.

BACKGROUND

1. Technical Field

The present invention relates to coded modulation and more particularly to polarization-division multiplexed (PDM) discrete-time non-binary low-density parity-check-coded modulation (NB-LDPC-CM).

2. Description of the Related Art

Due to the rapid growth of data-centric services and the general deployment of broadband access networks in recent years, there has been an elevated demand driving the dense wavelength division multiplexing (DWDM) network upgrade from 10 Gb/s per channel to more spectrally-efficient channel transmission rates. However, as the symbol rate increases, the deteriorating effects of linear and nonlinear fiber impairments are known to exacerbate. For example, as the communication rate over a given medium increases, transmission becomes increasingly sensitive to errors due to various linear and nonlinear channel impairments such as chromatic dispersion, PMD and fiber nonlinearities. The Shannon limit for a noise-influenced channel describes a maximum amount of error-free data that can be transmitted with a specified bandwidth—it is therefore helpful to have robust codes and modulation schemes that closely approach the Shannon limit without imposing high requirements in terms of implementation cost and complexity.

Bit interleaved (BI) low-density parity-check (LDPC) coded modulation (CM) based on large girth LDPC codes provides excellent performance, but requires code rate and bandwidth to increase in order to compensate for information loss due to coding. Meanwhile, quasi-cyclic (QC) LDPC codes are easy to implement, but this comes at the expense of performance. Large-girth QC-LDPC codes provide good bit-error rate (BER) performance, but require excessive codeword length for larger girths, as the code rate, and therefore the bandwidth, must increase to compensate for information loss due to coding. Another approach used to enable higher speed data transport is the concatenation of trellis-coded modulation (TCM) (initially introduced for wire-line transmissions) with an outer interleaved Bose-Chaudhuri-Hocquenghem (BCH) code. However, as discussed further below, the performance of systems using BCH-TCM lags far behind that of systems using LDPC codes, at least in part because those systems use weak convolutional codes.

SUMMARY

A method for data transport, comprising encoding one or more streams of input data using at least two nonbinary low density parity check (NB-LDPC) encoders, corresponding to two orthogonal polarization states; receiving the one or more streams of input data using a buffer coupled to the at least two encoders, the input data being written to the buffer bR bits at a time, where R is the code rate; generating one or more signals using a $2^b$-ary mapper implemented as a look-up table (LUT) to store coordinates of a corresponding signal constellation, the $2^b$-ary mapper configured to assign bits of one or more signals to a signal constellation and to associate the bits of the one or more signals with signal constellation points, wherein the signal constellation is expanded to avoid bandwidth expansion due to coding, thereby generating a substantial net coding gain within a same bandwidth; modulating the output of the mapper onto a transmission medium by using at least one in-phase/quadrature (I/Q) modulator; and multiplexing two independent nonbinary LDPC-coded data streams using a polarization beam combiner.

A transmitter, comprising one nonbinary low density parity check (NB-LDPC) encoder per single polarization, corresponding to at least two orthogonal polarizations, with at least two encoders (one per polarization) being configured to encode one or more streams of input data; a buffer coupled to the at least two encoders to receive the one or more streams of input data, the input data being written to the buffer bR bits at a time, where R is the code rate; a $2^b$-ary mapper, having an arranged structure stored in a storage medium, used to generate one or more signals, the $2^b$-ary mapper configured to assign bits of the one or more signals to a signal constellation and to associate the bits of the one or more signals with signal constellation points, wherein the signal constellation is expanded to avoid bandwidth expansion due to coding, thereby generating a substantial net coding gain within a same bandwidth; a modulator configured to construct one or more modulated waveforms from a set of data symbols, wherein each modulated waveform corresponds to a distinct point on an expanded signal constellation; a four-dimensional (4-D) modulator configured to modulate a source in accordance with the output of the mapper onto a data transmission medium, wherein the 4-D modulator includes a polarization beam splitter (PBS), two I/Q modulators, and a polarization beam combiner (PBC); and a mode-multiplexer configured to combine polarization-multiplexed streams for transmission over a transmission medium.

A receiver, comprising one or more detectors, corresponding to at least two orthogonal polarization branches, configured to extract symbols from a data transmission medium and to output a coded stream; a demapper configured to calculate symbol log-likelihood ratios (LLRs) used for NB-LDPC decoding, wherein one demapper is employed per single polarization; and one or more NB-LDPC decoders adapted to function with an expanded signal constellation, wherein the one or more NB-LDPC decoders are configured to decode one nonbinary data stream per single polarization of input data from the expanded signal constellation, and to pass decoded information symbols to the end user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided to enable ultra-high speed serial optical transport that may employ commercially available equipment operating at lower speed by employing nonbinary low density parity check (NB-LDPC) codes using polarization-division multiplexed (PDM) discrete-time non-binary LDPC-coded modulation (NB-LDPC-CM). The present system/method expands the signal constellation to avoid bandwidth expansion due to coding while not causing a significant increase in the optical signal-to-noise ratio (OSNR). Being larger in size, and therefore having a higher spectral efficiency, the expanded signal constellation can effectively transmit information symbols along with the added parity symbols without requiring bandwidth expansion or the use of additional outer codes. Spectral efficiency of a modulation method may be employed to describe an efficiency of transmission (i.e., how much data rate per unit of bandwidth). Using NB-LDPC-CM according to the present principles, the channel information capacity limit can advantageously be very nearly reached (e.g., within 1.07 dB of the 8-point quadrature amplitude modulation (8-QAM) information capacity) without bandwidth expansion or a significant increase in OSNR.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
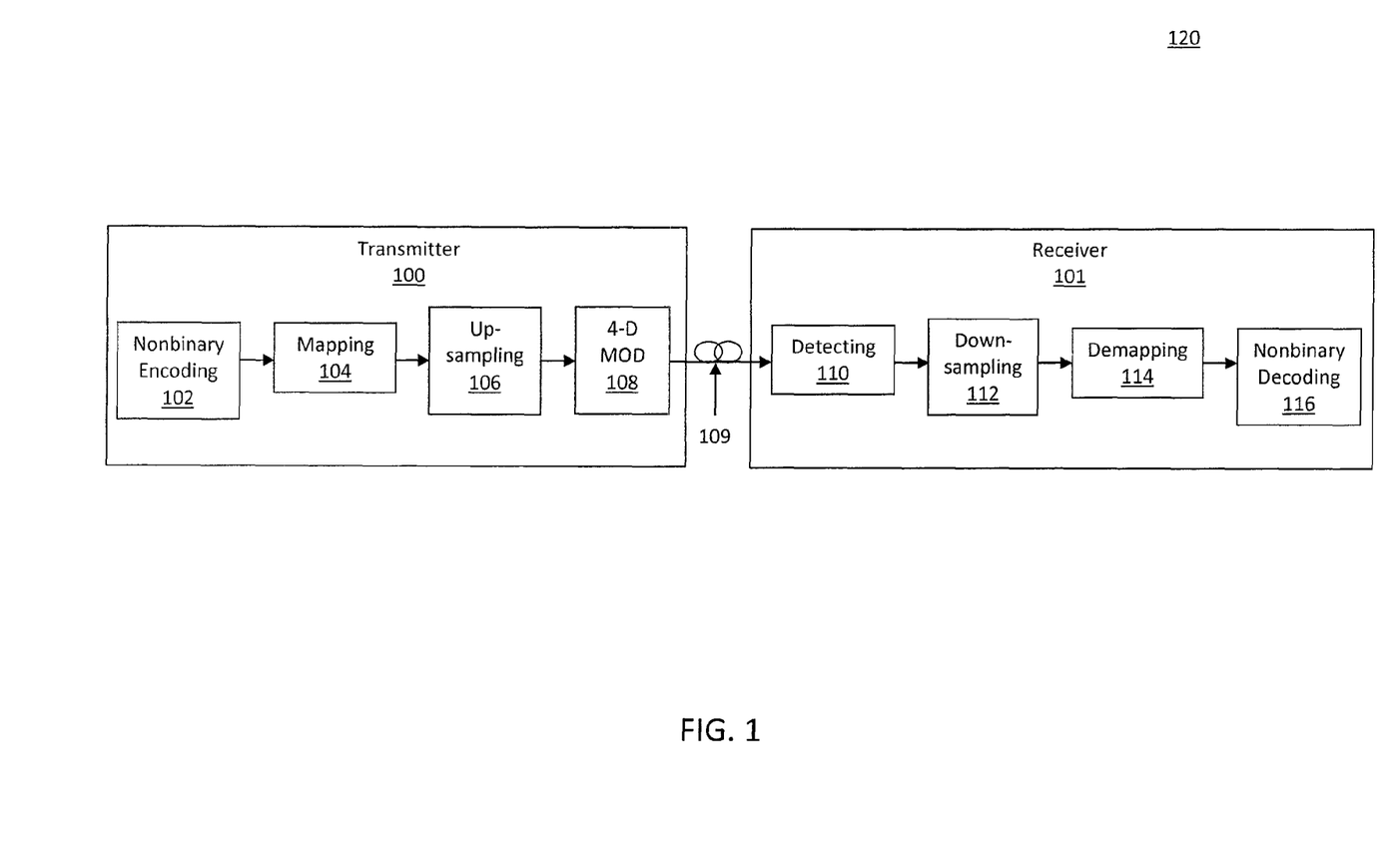
FIG. 1 is a block/flow diagram illustrating a system/method for optical data transmission that employs polarization-division multiplexed (PDM) discrete-time non-binary low density parity check-coded modulation (NB-LDPC-CM) in accordance with the present principles.

Referring now in detail to the figures in which like numerals represent the same or similar elements and initially to FIG. 1, an optical communication system 120 is illustratively shown comprising a transmitter 100 and a receiver 101. Although the transmitter 100 and the receiver 101 are both illustratively shown, one skilled in the art would appreciate that the transmitter 100 or receiver 101 may each be employed separately, or in combination with each other in accordance with the present principles. In an illustrative embodiment, the details corresponding to either fundamental mode in SMF or one spatial mode in FMF are provided. FMFs are defined as optical fibers that support more than one spatial mode, but fewer spatial modes than conventional multi-mode fibers. While the details corresponding to either fundamental mode in SMF or one spatial mode in FMF are illustratively provided, it is contemplated that other modes may also be employed (e.g., few-core fiber, few-mode-few-core fiber, or multi-mode fiber). The transmitter 100 encodes a plurality of data signals at the encoder block 102 and then maps those signals at a quadrature amplitude modulation (QAM) mapping block 104.

The QAM mapping block 104 assigns bits of the signal to a signal constellation and associates the bits of the data signals with signal constellation points. The QAM mapping block 104 provides the coordinates of the corresponding signal constellation points. In one embodiment according to the present principles, the present scheme advantageously expands the underlying signal constellation size and places the parity-check bits of forward error correction (FEC) in additional signal constellation points of expanded signal constellation to achieve coded transmission without bandwidth expansion. In contrast, a conventional approach requires an increase in the symbol rate, and thus the occupied bandwidth, to to accommodate for redundant symbols due to FEC.

The in-phase (I) and quadrature (Q) coordinates of the QAM signal constellation points are employed as input to an up-sampler 106, which after digital to analog conversion (DAC) and discrete-time (DT) pulse shaping, the outputs are employed as inputs to the 4 Dimensional I/Q modulator (4-D MOD) 108. For example, in one embodiment, two I/Q MODs are used in combination with a polarization beam combiner (PBC) to create a 4-D MOD 108. In one embodiment, signal generation may be separated into two distinct parts: modulation, which is a discrete set of values called the signal constellation, and pulse shaping to create the pulse waveforms. The size of the constellation determines the maximum information that each symbol can carry, while pulse shaping affects the spectral width occupied by the signal. The transmitter 100 then sends the signal to the receiver 101 over an optical medium 109 (e.g., single-mode fiber, few-mode fiber, few-core fiber, few-mode-few-core fiber, or multi-mode fiber). While the medium is advantageously shown as an optical medium, it is contemplated that other sorts of media may also be employed according to the present principles.

In one embodiment according to the present principles, the receiver 101 detects symbols in the signal constellation in block 110 to recover in-phase and quadrature signals from two or more polarizations/spatial modes, which after analog to digital conversion (ADC) are down-sampled to represent projections along I- and Q-coordinates. In one embodiment, when FMF is used instead of SMF, a spatial mode demultiplexer (not shown) is employed before detecting block 110. The a posteriori probability (APP) demapping block 114 calculates symbol log-likelihood ratios (LLRs), which are used for nonbinary LDPC decoding. The signals are then decoded at block 116 to produce the original data signals. Although the transmitter 100 and receiver 101 are both illustratively shown, one skilled in the art would appreciate that the transmitter 100 or receiver 101 may each be employed separately, or in combination with each other in accordance with the present principles.

For example, in an illustrative embodiment, the encoders and decoders make use of NB-LDPC codes to provide a system/method with excellent net coding gains (e.g., between 11.5 dB and 12 dB at the BER of $10^{-15}$ for 2 bits/symbol) without requiring bandwidth expansion. To avoid bandwidth expansion due to coding, the original signal constellation (e.g., of uncoded signal) is advantageously expanded rather than the bandwidth. Because the signal constellation used is larger in size and therefore has a higher spectral efficiency, the expanded constellation can effectively transmit information symbols along with added parity symbols within the same bandwidth, and therefore does not require any bandwidth expansion. This scheme provides for substantial net coding gains while using commercially available equipment operating at lower speeds.

Figure 6:
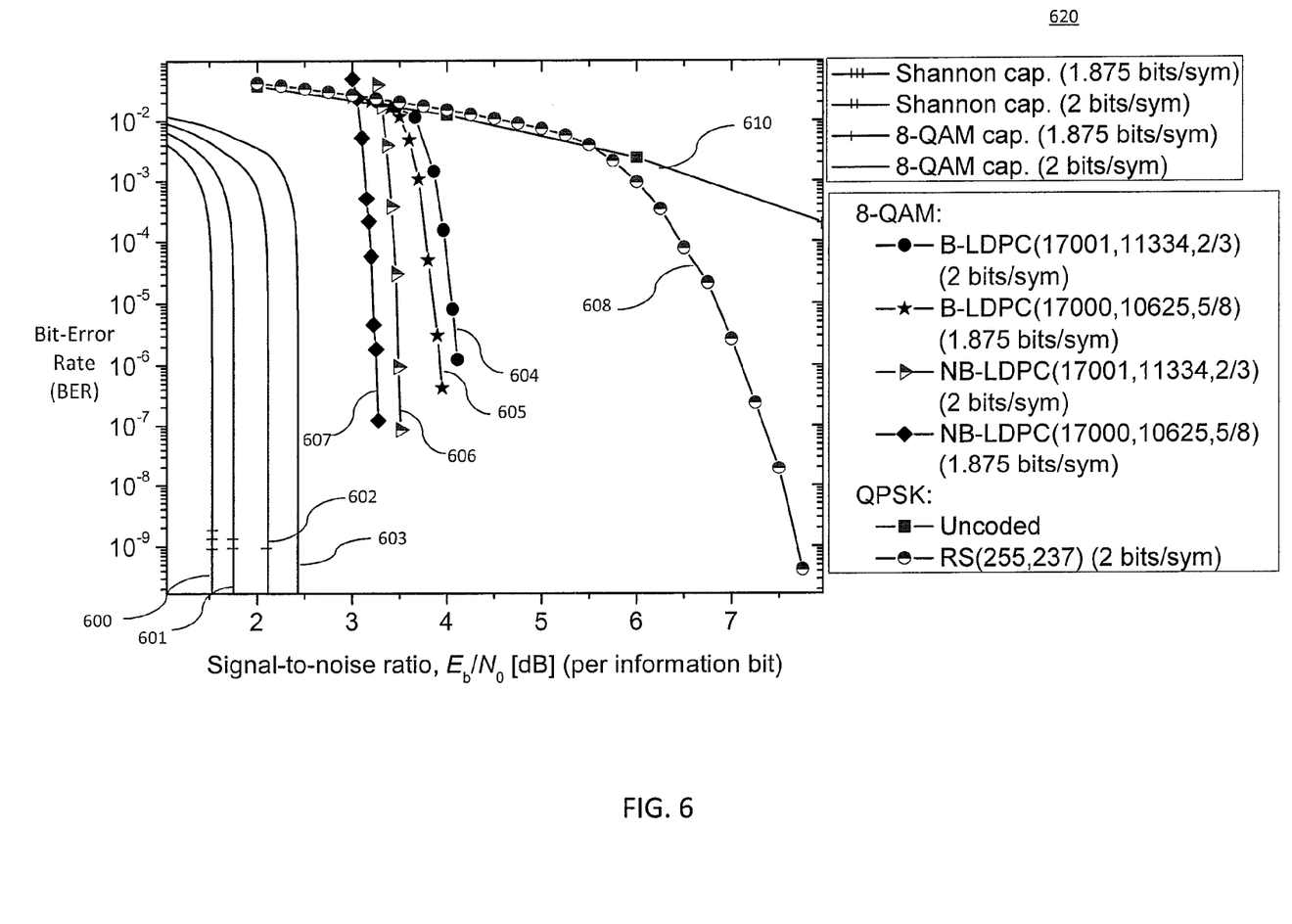
FIG. 6 is a plot of bit error rate (BER) versus signal to noise ratio (SNR) for performance for an NB-LDPC-CM system/method, where BER performance is reported per single polarization and per single spatial mode, provided in accordance with the present principles.

The present principles also do not require the increase of channel rate to compensate for code rate. Instead, the larger signal constellation is employed to accommodate for parity symbols, and channel capacity approaching NB-LDPC codes are employed rather than the weak convolution codes used in trellis code modulation (TCM). In one embodiment, a modulator may be employed to construct a modulated waveform from a set of data symbols, and each distinct point on a signal constellation corresponds to a different modulated waveform. The performance of TCM has been improved using outer Reed-Solomon (RS) codes or outer interleaved Bose-Chaudhuri-Hocquenghem (BCH) codes, and can provide a net coding gain of 9.7 dB at the BER of $10^{-13}$ for 2 bits/symbol. However, in accordance with an illustrative embodiment of the present principles, the net coding gain for 2 bits/symbol advantageously outperforms the BCH-TCM scheme by more than 1 dB (e.g., ~11.5 dB at the BER of $10^{-15}$ for 2 bits/symbol—as shown in FIG. 6), while approaching the 8-QAM channel capacity within 1.07 dB using reasonably short LDPC codes in Galois field (GF) sizes over 4.

In accordance with an illustrative embodiment, the aggregated data rate is $2NbRR_s$, where $R_s=1/T_s$ is the symbol rate, the factor of two originates from polarization multiplexing, and factor N from N spatial modes used in FMFs. For example, in one embodiment, by using R=2/3 NB-LDPC code, in combination with 8-QAM (b=3) for symbol rate $R_s$=25 Giga Symbols per second (GS/s), the aggregate data rate is $2bRR_s$=100 Gigabytes per second (Gb/s) per single spatial mode. The spectral efficiency of the present system/method far exceeds currently existing polarization-division-multiplexed quadrature-phase-shift-keying (PDM-QPSK) schemes because PDM-QPSK schemes would require an operating symbol rate of $R_s/R$ for the same number of information bits per symbol, which leads to higher sensitivity to fiber nonlinearities and polarization mode dispersion (PMD), in addition to requiring employment of higher speed electronics. Although the present principles are advantageously suited for software defined optical transport (SDOT), and can be employed for rate adaptation by adjusting the signal constellation size and code rate of quasi-cyclic NB-LDPC codes based on channel conditions, it is contemplated that the present principles may also be effectively applied to other sorts of transport systems.

Figure 2:
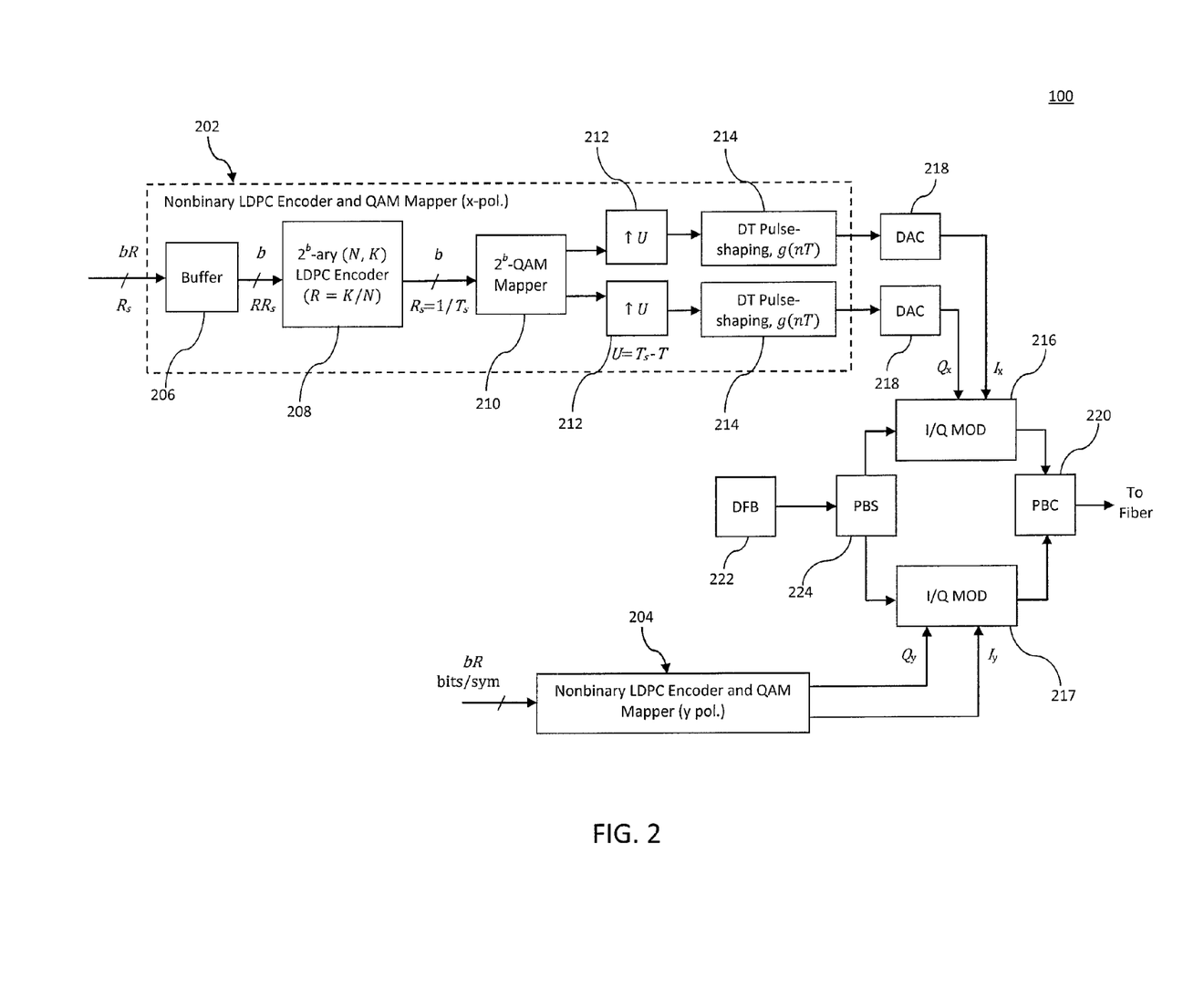
FIG. 2 is a block diagram illustrating a system/method for an optical transmitter that employs PDM discrete-time NB-LDPC-CM in accordance with the present principles.

Referring now to FIG. 2, a detailed view of the transmitter 100 is shown. In an illustrative embodiment according to the present principles corresponding to one spatial mode in FMF or fundamental mode in SMF, one or more independent $2^b$-ary data streams, one for each polarization branch, are written to a buffer 206 bR bits at a time, where R is the code rate of non-binary LDPC code. In addition, $R_s$ represents the symbol rate and $T_s$ represents the symbol duration. Two NB-LDPC encoders and QAM mappers 202 and 204, corresponding to an x- and y-polarization, respectively, are shown. Although x- and y-polarizations are illustratively shown, it is contemplated that other polarizations may be employed in accordance with the present principles.

In accordance with one embodiment, there are b bits taken from the buffer 206 and passed to a $2^b$-ary (N,K) LDPC encoder 208 of rate R=K/N, where K is the number of information symbols and N is the codeword length. The LDPC encoded non-binary sequence is employed as an input to the buffer 206. The b bits are used at the output of the buffer 206 to select a signal constellation point from a $2^b$-ary quadrature amplitude modulation (QAM) mapper 210, implemented as a look-up table (LUT). Although a QAM mapper and a LUT are illustratively shown, it is contemplated that other sorts of mappers and arranged structures may be employed in accordance with the present principles. The QAM mapper 210 provides the coordinates of a corresponding constellation point. For example, in an illustrative embodiment, by using R=2/3 8-ary LDPC code (b=3), bR=2 information bits per 8-QAM signal constellation point are effectively transmitted without bandwidth expansion.

In an illustrative embodiment, the in-phase (I) and quadrature (Q) coordinates of the QAM signal constellation point are employed as an input, for both x and y polarizations, to one or more up-sampler(s) 212 with a sampling factor of U, where $U=T_s/T$, with $T_s$ being the symbol duration and T being the sampling interval. The uncoded referent case (e.g., uncoded QPSK) is $2^{bR}$-QAM. After up-sampling at block 212, the I/Q coordinates are passed through one or more discrete-time pulse-shaping filter(s) (DT pulse shaping) 214 of impulse response h(n)=g(nT). The outputs of the DT pulse shaping filters 214 are used as I and Q inputs of I/Q modulator (I/Q MOD) 216 after digital-to-analog conversion (DAC) 218 is performed. At least two I/Q modulators 216 and 217 are used, one for x-polarization 216 and one for y-polarization 217. Two independent NB-LDPC-coded QAM streams corresponding to x- and y-polarizations are combined into single optical signal by polarization beam combiner (PBC) 220, and then transmitted over an optical communication system of interest. Although x- and y-polarizations are illustratively shown, it is contemplated that other orthogonal polarizations (such as right- and left-circular) may be employed in accordance with the present principles. Furthermore, although an optical communication system with details corresponding to one spatial mode in FMF or fundamental mode in SMF are illustratively shown, it is contemplated that other sorts of transport media and modes may also be employed in accordance with the present principles.

In one embodiment, a distributed feedback (DFB) laser 222 is provided as an optical source. The output of the DFB laser 222 has its polarization separated by a polarization beam splitter (PBS) 224 into at least two orthogonal polarizations. One advantageous embodiment of the present principles provides for implementing the above-mentioned features on a single Field Programmable Gate Array (FPGA); however, it is contemplated that other sorts of devices may also be used. For example, in one embodiment, two independent NB-LDPC-coded data streams are multiplexed together by polarization-beam combiner (PBC) 220. In FMF applications, the outputs of PBCs 220 corresponding to different spatial modes are combined by mode multiplexer before being transmitted over FMF. In one embodiment, a mode-multiplexer may be configured to combine mode-multiplexed streams for transmission over FMF links. N spatial modes may be employed, wherein N independent polarization-multiplexed streams are mode-multiplexed and transmitted over FMF. In another embodiment, a polarization-multiplexer may be configured to combine polarization-multiplexed streams for transmission over SMF links. N spatial modes may be employed, wherein N independent polarization-multiplexed streams are polarization-multiplexed over SMF. The PBS, two I/Q MODs, and two PBCs may be components of the above-mentioned 4-D modulator. While a 4-D MOD is illustratively shown, it is contemplated that other sorts of modulators may also be employed in accordance with the present principles.

Figure 3:
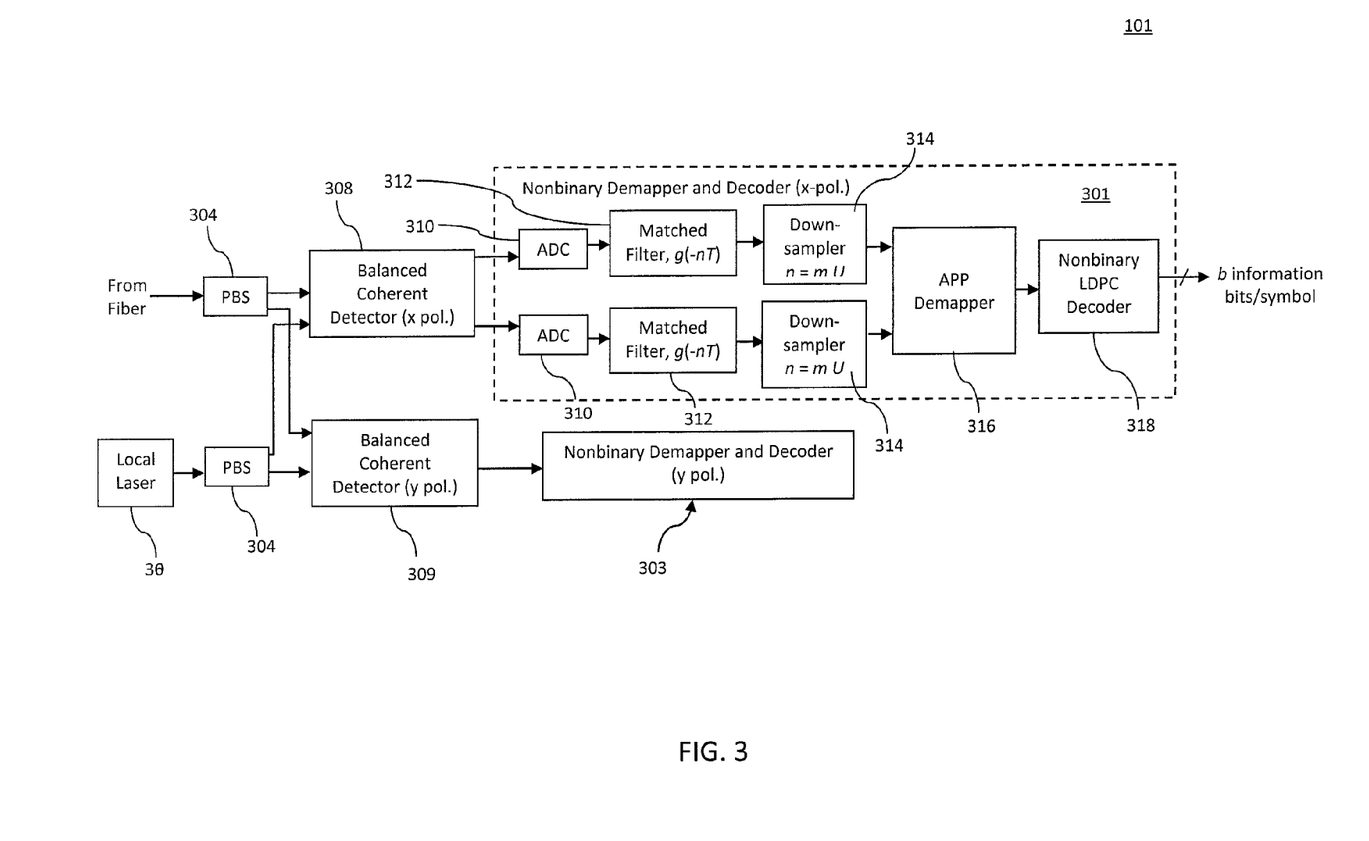
FIG. 3 is a block diagram illustrating an optical transmission receiver in accordance with the present principles.

Referring now to FIG. 3, a detailed view of the receiver 101 configuration is shown. In an illustrative embodiment according to the present principles, two nonbinary demappers and NB-LDPC decoders 301 and 303, corresponding to an x- and y-polarization, respectively, are shown. Although x- and y-polarizations are illustratively shown, it is contemplated that other orthogonal polarizations may be employed in accordance with the present principles. For example, in an illustrative embodiment according to the present principles, for FMF applications, the signal transmitted over FMF is first split by a mode demultiplexer into different spatial modes, and each of the spatial modes are used as inputs to one or more polarization beam splitters (PBSs) 304. An optical signal is received from an optical fiber and is split at a PBS 304. Although an optical fiber and signal is illustratively shown, it is contemplated that other sorts of transport systems and media may also be employed. Balanced coherent detectors 308 and 309 are shown, each corresponding to x-polarization and y-polarization, respectively, which demodulate the beams to recover in-phase (I) and quadrature (Q) signals. Although the detectors 308 and 309 are advantageously implemented as balanced coherent detectors, it is contemplated that other sorts of detectors might be used. In embodiments that employ balanced coherent detection, a local laser source 306 is employed to provide the detectors 308 and 309 with a local reference that allows them to quickly distinguish between the orthogonal polarizations and extract the information.

In one embodiment, after analog to digital conversion (ADC) in block 310, the I/Q signals produced by the detectors are used as inputs to one or more matched filters 312 of impulse response g(−nT). Corresponding matched filter 312 outputs are down-sampled using at least two down-samplers 314. After down-sampling in block 314, the matched filter 312 outputs represent projections along the I- and Q-coordinates. The I/Q projections are forwarded to an a posteriori probability (APP) demapper 316, which calculates symbol log-likelihood ratios (LLRs), which are used for nonbinary LDPC decoding using a nonbinary LDPC decoder 318. Although an APP demapper is illustratively employed according to the present principles, it is contemplated that other sorts of demappers may also be used. The nonbinary LDPC decoder 318 then passes the information bits/symbols to the end user. One advantageous embodiment of the present principles provides for implementing the above-mentioned features on a single Field Programmable Gate Array (FPGA); however, it is contemplated that other sorts of devices may also be used.

Figure 4:
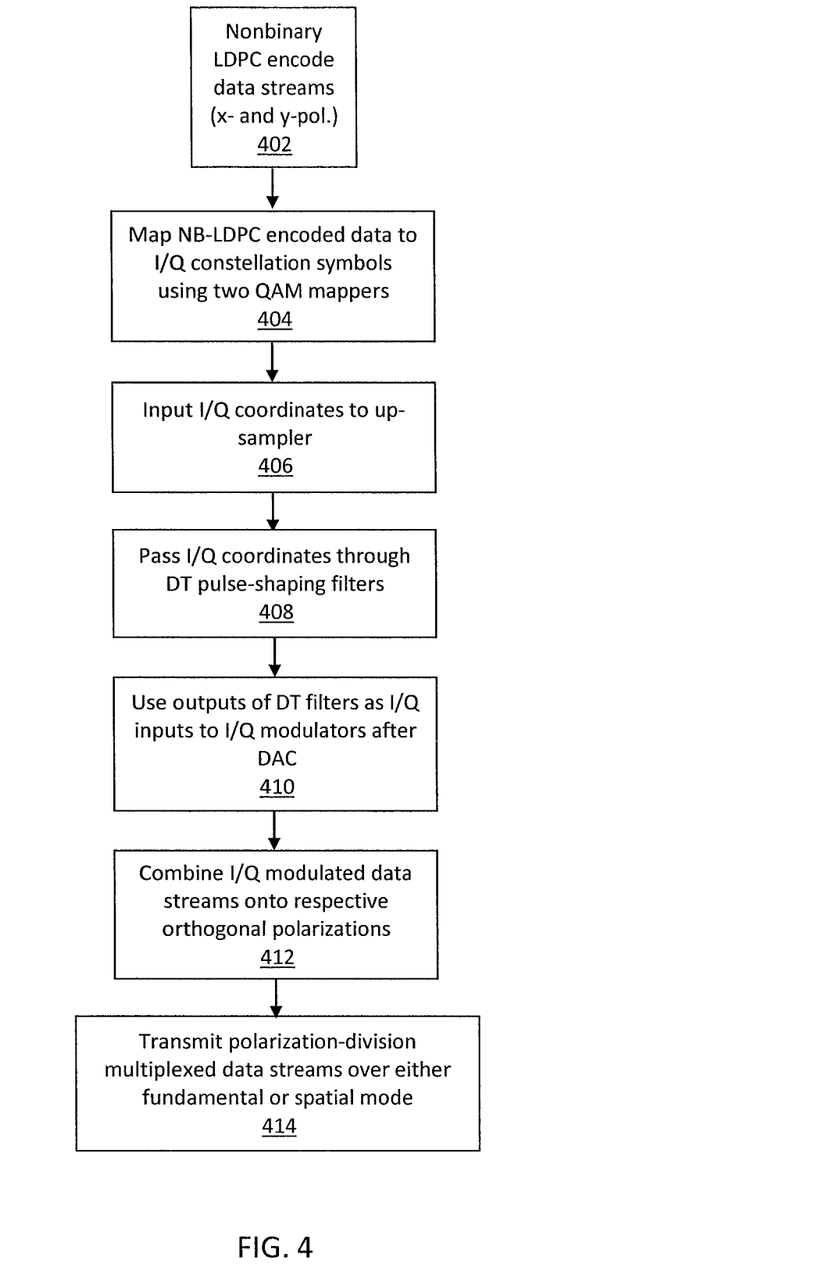
FIG. 4 is a block/flow diagram illustrating a system/method for transmitting data using PDM discrete-time NB-LDPC-CM, with details corresponding to either fundamental mode in single-mode fiber (SMF) or one spatial mode in few-mode fiber (FMF), provided in accordance with the present principles.

Referring now to FIG. 4, a system/method for encoding and modulating data for transmission using NB-LDPC codes with I/Q modulation in accordance with the present principles is shown. These methods provide for very high transmission rates (e.g., in excess of 400 Gb/s, in excess of 1 Tb/s), and excellent net coding gains (e.g., at least 11.5 dB at BER of $10^{-15}$ for 2 bits/symbol for code rates of 0.8). In one embodiment, a plurality of data streams are encoded at block 402 using NB-LDPC coded-modulation. The encoded streams are then mapped to the symbols of an I/Q constellation, such as those described above, using a QAM mapper at block 404. The I/Q coordinates are input into the up-sampler in block 406, and are then passed through DT pulse-shaping filters in block 408. The outputs of the DT pulse-shaping filters in block 408 are employed as I/Q inputs after DAC in block 410. The I and Q values for each set of symbols are used to modulate the symbols onto orthogonally polarized carrier beams via phase modulation at block 412 before at least two independent orthogonal polarizations are combined into a single beam for transmission at block 412. The combined carrier beam can then be transmitted over an optical fiber to its destination in block 414. In one embodiment, the optical fiber can be either SMF or FMF. Although an optical fiber and single carrier beam is illustratively shown, it is contemplated that other sorts of transport systems and media may also be employed in accordance with the present principles.

Figure 5:
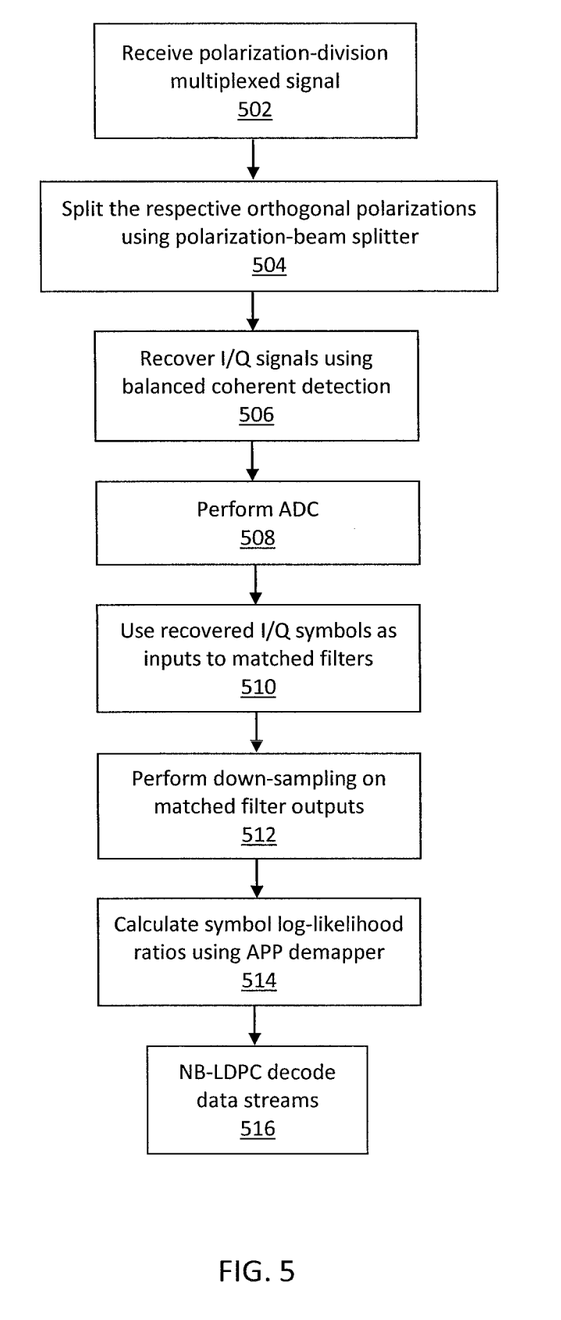
FIG. 5 is a block/flow diagram illustrating a system/method for receiving data using PDM discrete-time NB-LDPC-CM, with details corresponding to either fundamental mode in SMF or one spatial mode in FMF, provided in accordance with the present principles.

Referring now to FIG. 5, a system/method for receiving and decoding received data is shown. A polarization-division multiplexed (PDM) signal is received from an optical transmission fiber at block 502 and is then split into two orthogonal polarizations at block 504. In one embodiment, when FMF is used as a transport medium, the mode demultiplexer is employed in front of one or more PBSs. I/Q signals are then detected and recovered by employing one or more balanced coherent detectors at block 506. It is contemplated that any method of detection (e.g., homodyne, heterodyne, intradyne, or single photodetector-based detection) could be used, but for illustrative purposes, balanced coherent detection is employed herein. After ADC is performed in block 508, the resulting I/Q symbols are used as inputs to the matched filters in block 510. Down-sampling is then performed on the matched filter outputs in block 512, followed by the calculation of symbol log-likelihood ratios (LLRs) using an APP demapper in block 514. These symbol LLRs are employed to decode the NB-LDPC encoded data at block 516.

Referring now to FIG. 6, results of Monte Carlo simulations 620 illustrating the BER performance of an NB-LDPC coded 8-QAM 606 and 607 without bandwidth expansion, for 1.875 bits/symbol and 2 bits/symbol, respectively, are shown. In the same figure, Shannon capacity plots 600 and 601, and 8-QAM capacity plots 602 and 603 are provided for 1.875 bits/symbol and 2 bits/symbol, respectively, to illustrate the nearness to the theoretical Shannon limits provided for by the present principles. In accordance with an illustrative embodiment, both binary and nonbinary LDPC codes have the same lengths of approximately 17,000. In one embodiment, the NB-LDPC (17001, 11334)-coded 8-QAM scheme, carrying 2 bits/symbol 607, outperforms its binary counterpart 604 by 0.64 dB at the BER of $10^{-6}$ while outperforming an RS (255, 239)-coded QPSK 608 (that employs bandwidth expansion) by 3.62 dB at the same BER. In one embodiment, the uncoded referent case is the uncoded QPSK. For example, in one embodiment employing the present principles, the net coding gain at a BER of $10^{-6}$ is 7.06 dB, while coding gain at the BER of $10^{-15}$ is 11.7 dB. At the BER of $10^{-6}$, an illustrative embodiment according to the present principles is only 1.07 dB away from 8-QAM capacity for 2 bits per symbol.

Monte Carlo simulation results are also shown for an illustrative embodiment for an NB-LDPC (17000, 10625)-coded 8-QAM that carries 1.875 bits/symbol 607 to illustrate the advantages of the present scheme over a competitive concatenated BCH-TCM scheme with the same number of information bits per symbol. In an illustrative embodiment, the present scheme outperforms competitive concatenated BCH-TCM schemes by more than 1 dB. In an illustrative embodiment, the system/method in accordance with the present principles advantageously provides for a net coding gain of 7.28 dB at the BER of $10^{-6}$, a net coding gain of 11.7 dB at a BER of $10^{-15}$, and is only 1.15 dB away from the 8-QAM capacity for 1.875 bits/symbol 602 at the BER of $10^{-6}$. Finally, it is shown that the NB-LDPC-CM scheme for 1.875 bits/symbol 607 according to the present principles outperforms its binary LDPC-CM counterpart 605 by 0.7 dB (for 1.875 bits per symbol at a BER of $10^{-6}$).

Having described preferred embodiments of a system and method for a nonbinary LDPC coded modulation without bandwidth expansion for high-speed optical transmission (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for data transport, comprising:
    encoding one or more streams of input data using at least two nonbinary low density parity check (NB-LDPC) encoders, corresponding to two orthogonal polarization states;
    receiving the one or more streams of input data using a buffer coupled to the at least two encoders, the input data being written to the buffer bR bits at a time, where R is the code rate;
    generating one or more signals using a 2b-ary mapper implemented as a look-up table (LUT) to store coordinates of a corresponding signal constellation, the 2b-ary mapper configured to assign bits of one or more signals to a signal constellation and to associate the bits of the one or more signals with signal constellation points, wherein the signal constellation is expanded to avoid bandwidth expansion due to coding, thereby generating a net coding gain within a same bandwidth;
    modulating the output of the mapper onto a transmission medium by using at least one in-phase/quadrature (I/Q) modulator; and
    multiplexing two independent nonbinary LDPC-coded data streams using a polarization beam combiner.

2. The method as recited in claim 1, further comprising polarization-multiplexing of two independent nonbinary LDPC-coded data streams, wherein a polarization-multiplexed signal is transmitted over single-mode fiber (SMF) employing two polarization modes.

3. The method as recited in claim 1, further comprising mode-multiplexing of N independent polarization-multiplexed data streams, wherein a mode-multiplexed signal is transmitted over few-mode fiber (FMF) employing N spatial modes.

4. The method as recited in claim 1, further comprising a receiver configured
    to perform the steps of:
    extracting symbols from the at least one data transmission medium using one or more detectors corresponding to at least two orthogonal polarization branches, and outputting a coded stream;
    polarization-demultiplexing the symbols transmitted over the at least one data transmission medium;
    computing symbol log-likelihood ratios (LLRs) using one demapper per single polarization; and
    decoding one nonbinary data stream per single polarization of input data from the expanded signal constellation using one NB-LDPC decoder per single polarization adapted to function with the expanded signal constellation, and passing decoded information symbols to the end user.

5. The method as recited in claim 4, further comprising mode-demultiplexing of the symbols transmitted over few-mode fiber link.

6. The method as recited in claim 1, wherein the data transmission medium is an optical medium, with the optical medium being one or more of single-mode fiber, few-mode fiber, few-core fiber, few-mode-few-core fiber, or multi-mode fiber.

7. The transmitter as recited in claim 6, wherein the data transmission medium is an optical medium implemented as at least one of a SMF and a few-mode fiber FMF.

8. The method as recited in claim 1, further comprising generating encoded signals of a fixed bandwidth, wherein the signal constellation is expanded to accommodate for parity symbols.

9. A transmitter, comprising:
    one nonbinary low density parity check (NB-LDPC) encoder per single polarization, corresponding to at least two orthogonal polarizations, with at least two encoders (one per polarization) being configured to encode one or more streams of input data;
    a buffer coupled to the at least two encoders to receive the one or more streams of input data, the input data being written to the buffer bR bits at a time, where R is the code rate;
    a 2b-ary mapper, having an arranged structure stored in a storage medium, used to generate one or more signals, the 2b-ary mapper configured to assign bits of the one or more signals to a signal constellation and to associate the bits of the one or more signals with signal constellation points, wherein the signal constellation is expanded to avoid bandwidth expansion due to coding, thereby generating a net coding gain within a same bandwidth;
    a modulator configured to construct one or more modulated waveforms from a set of data symbols, wherein each modulated waveform corresponds to a distinct point on an expanded signal constellation;
    a four-dimensional (4-D) modulator configured to modulate a source in accordance with the output of the mapper onto a data transmission medium, wherein the 4-D modulator includes a polarization beam splitter (PBS), two I/Q modulators, and a polarization beam combiner (PBC); and a mode-multiplexer configured to combine polarization-multiplexed streams for transmission over a transmission medium.

10. A receiver, comprising:

one or more detectors, corresponding to at least two orthogonal polarization branches, configured to extract symbols from a data transmission medium and to output a coded stream;

a demapper configured to calculate symbol log-likelihood ratios (LLRs) used for NB-LDPC decoding, wherein one demapper is employed per single polarization; and one or more NB-LDPC decoders adapted to function with an expanded signal constellation, wherein the one or more NB-LDPC decoders are configured to decode one nonbinary data stream per single polarization of input data from the expanded signal constellation, and to pass decoded information symbols to the end user;

wherein the expanded signal constellation uses in-phase (I) and quadrature (Q) coordinates of the signal constellation points as an input to a down-sampler with a sampling factor of U, where $U=T_s/T$, with $T_s$ being the symbol duration and T being the sampling interval.

11. The receiver as recited in claim 10, wherein the data transmission medium is an optical medium implemented as at least one of a single-mode fiber (SMF) and a few-mode fiber (FMF).

* * * * *